Jan. 20, 1959     D. O. BENSON     2,869,309
REEL-TYPE MOWER
Filed Dec. 27, 1956
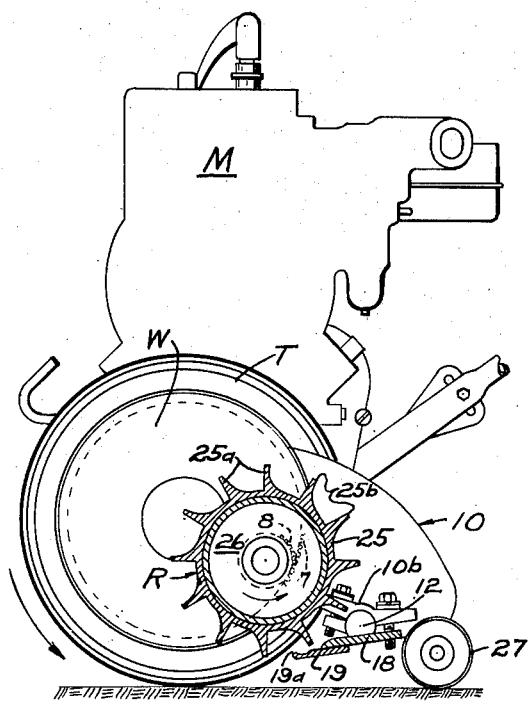
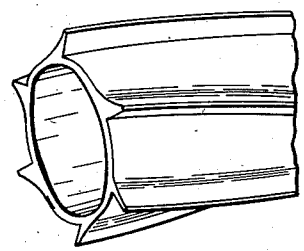
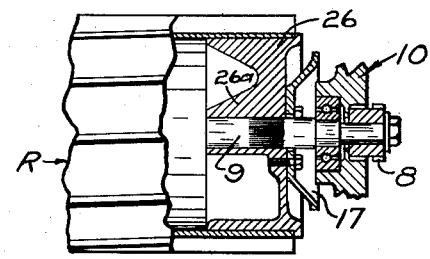
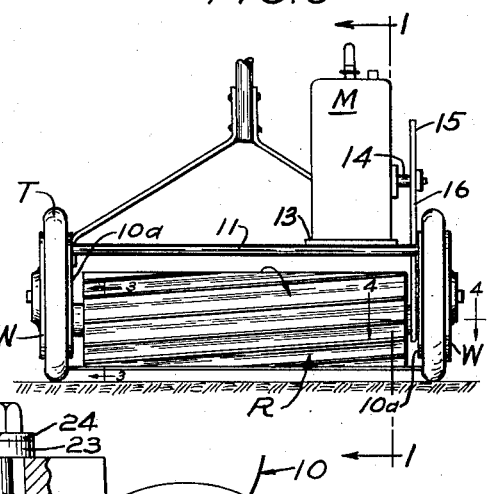
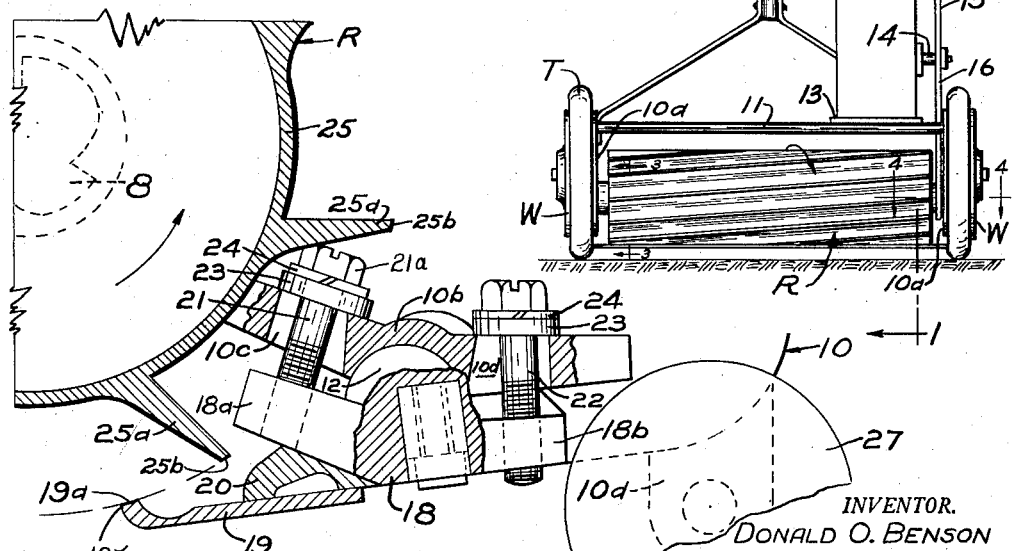
INVENTOR.
DONALD O. BENSON
BY
Williamson, Schroeder,
Adams + Meyers
ATTORNEYS

United States Patent Office 2,869,309
Patented Jan. 20, 1959

2,869,309

REEL-TYPE MOWER

Donald O. Benson, Minneapolis, Minn., assignor to Toro Manufacturing Corporation, Minneapolis, Minn., a corporation of Minnesota Application December 27, 1956, Serial No. 630,886

6 Claims. (Cl. 56—249)

This invention relates to a substantially improved construction of reel-type mower particularly adapted for the mowing of lawns but readily capable of other uses where it is desired to efficiently cut off to a uniform height, the top ends of grass or other plant stalks.

My invention particularly through the combinative relationship of a novel cutter reel and the blades thereof, with stationary bed-knife, produces a new and materially improved shearing fit and self-adjustability between the working parts of the lawn mower with consequently, a more uniform and efficient shearing action as contrasted with prior art structures.

In the preferred form of my invention, a further important object is attained in the substantial elimination of forward down draft now present in substantially all reel-type mowers now in use. The elimination of this down draft permits the grass forwardly of the mower to stand normally erect rather than to be deflected forwardly and downwardly relative to bed-knife and cutter reel.

A further object of my invention is the provision of a lawn mower and the like of the character previously described and wherein the quantity and expense of requisite materials are very substantially reduced together with labor of assembly.

Another object is the provision of a mower of the class described wherein the number of helical cutter reel blades for a given orbital diameter of cutter reel may be very substantially increased as contrasted with the prior art, without increased cost and in fact, at less expense than conventional spider-type reels now in use. The substantial increase of helical cutter blades produces an overall cutting of grass where the spacing of the cutting "clips" is very close as contrasted with conventional reel-mowers to the end that a substantially uniform cut is obtained relatively free of the characteristic ripples or waves common after cutting with conventional mowers.

These and other objects and advantages of my invention will more fully appear from the following descriptions made in connection with the accompanying drawings, wherein like reference characters refer to similar parts throughout the several views and in which:

Fig. 1 is a vertical section taken longitudinally and substantially along the line 1—1 of Fig. 5, of an assembled power mower embodying my improved construction, conventional portions of the motor and frame being merely outlined;

Fig. 2 is a fragmentary, perspective view, on a larger scale, of a preferred type of cutter reel (with end cap closure removed);

Fig. 3 is a sectional view taken on line 3—3 of Fig. 5 on a larger scale than that of Fig. 1 through the medial portion of the cutter reel of Fig. 1 and the bed-knife closely associated therewith and showing means of vertical adjustment between bed-knife and cutter reel blades (some portions being broken away);

Fig. 4 is a detail enlarged sectional view partly in elevation and partly in longitudinal section along line 4—4 of Fig. 5 showing one end of my improved cutter reel and its mounting; and Fig. 5 is a front elevation of the power mower shown in Fig. 1 taken on a reduced scale.

It will be understood that my invention is equally applicable to power mowers of various types and also to manually pushed mowers.

Referring now to the embodiment of my invention employed in the power mower illustrated in the drawings, the side frame construction, tie rods, wheels and motor and motor support, are conventional. The wheels W as shown, have rims upon which rubber tires T are mounted and are provided in the usual manner with concentric internal gears 7 which are meshed with dog teeth 8 affixed to the cutter reel shaft 9 for driving the wheels through the cutter reel for forward propulsion of the mower while permitting the outside wheel in a turn to be manually pushed ahead of the inside wheel. The inner faces of the wheels W are closed and covered by shallow, cylindrical housing portions 10a of the side frame members 10 which frame members are interconnected in horizontally spaced relation by tie rods 11 at the upper portions thereof and a heavy, interconnecting shaft 12 at the lower portions thereof. Conventional motor M which may be of the internal combustion type or an electric motor, is supported on a mounting plate 13 affixed to and supported upon the upper tie rods 11 and has a power take-off shaft 14 extending horizontally and transversely of the machine and having affixed thereto a belt pulley 15 upon which is trained, as shown, a V-belt 16, the lower bend of which is trained about a driven pulley 17 affixed to one end of the reel shaft 9.

A transverse bed-knife bar 18 is supported from the rear and lower portions of the side frame members 10, being disposed below and rearwardly of the bottom portion of the cutter reel and as shown, being mounted for oscillatory adjustment on a horizontal transverse axis upon the heavy shaft 12 suitably journaled in inwardly projecting, rigid hanger mountings 10b which may be integrally formed with the side frame plates 10 (see Figs. 1 and 3). A relatively thin, hard metal bed-knife 19 (preferably constructed of steel) is secured to bed bar 18 as by welding or the like and at its forward edge 19b, projects some distance in advance of the forward edge of the bed bar and has a longitudinal shearing edge 19a appropriately disposed for contact or very close working relation with the cutting edges of the reel blades (later to be described).

Provision is made for easily and effectively adjusting the shearing edge 19a of the bed-knife relative to the cutter reel R. In the particular embodiment shown, provision is made for limited oscillatory adjustment of the bed bar 18 upon the axis of the shafts 12. Adjustment arms 18a and 18b are integrally formed or rigidly affixed to each of the ends of the bed bar, having threaded sockets tapped therein for receiving forward adjusting bolts 21 and rearward adjusting bolts 22. The forward adjustment bolts 21, at opposite ends of the bed bar extend through slotted portions 10c of hanger mountings 10b and carry adjacent their upper ends 21a clamping collars 23 of relatively large diameter. Preferably in each instance, a split resilient gasket 24 is interposed between the heads of the bolts and said collar 23. The rear adjustment bolts 22 (one at each end of the bed bar) extend through slotted portions 10d formed in hanger mountings 10b and carry adjacent their upper ends, collars 23 and as shown, split resilient gaskets 24, as in the case of the forward adjustment bolts. The said slots 10c and 10d formed in the hanger mountings 10b provide for the tilting of bolts 21 and 22 necessary in the oscillatory shifting of the bed bar for adjustment purposes. In the adjustment of course, one set of the bolts must be loosened and the other set tightened to securely clamp the bed bar and bed knife in a desired adjusted position, suspended by bearing engagement of the trunnions 12 from the hanger mountings 10b.

While my cutter reel may embody a variety of different constructions, all well adapted to successfully carry out my novel "shearing fit" and self-adjustability with the bed knife of the mower as well as to obtain substantial reduction in forward down draft now present in reel-type mowers in use, it is essential that the reel R comprises a multiplicity of spirally arranged blades or vanes 25a having longitudinal cutting edges 25b generating in revolution, a substantially cylindrical figure and lying within a common cylindrical orbit and constructed, at least as to the cutting edges 25b for some little thickness, of a metallic or other material relatively soft as contrasted with the material of the cutting edge portion of bed knife 19.

It is also highly desirable for reducing downward blower effect during cutting action, that cross sectionally the blades or vanes 25a, angle to some extent in the direction of rotation relative to radii of the cutter reel, as clearly shown in Figs. 1 and 3. I prefer that the acute angle of divergence relative to radius be within a range of from 15 to 20 degrees. It is further desirable, that the spaces between the several cutter blades 25a be circumferentially closed as by an integral hub construction 25 or the equivalent, through application of sectional hub or closure plates 26. If such hub structure is tubular, I prefer to close the two ends thereof by suitable means such as the internally fitted plug closures 26 (see Fig. 4). The cutting edges 25b of the multiplicity of the reel blades and preferably the entire blades, are constructed of metal or metal alloys such as for example some of the harder aluminum alloys but in any instance, a material considerably softer in wearing qualities than the material of the shearing portion of the thin bed knife 19. I have found aluminum alloy No. 6063 as manufactured by Aluminum Company of America and containing with aluminum, magnesium, iron, silicon, small amounts of copper, chromium, zinc and titanium excellent for the purposes desired.

To achieve a number of the advantages of my invention and for economy of materials and labor, I prefer to extrude the entire reel R, integrally from suitable metal or metal alloy preferably as previously recited, having wearing qualities considerably softer than the shearing portion of the thin bed knife 19. Extrusion of a tubular stock from a pre-heated, softened billet enables a multiplicity of spirally arranged blades to be employed, spaced relatively short distances apart to, in use, provide for shorter cutting "clips" as contrasted with the conventional, spider-supported cutter-reel-blades now in use. The substantial increase in number of circumferentially spaced blades very materially increases the cutting efficiency and smoothness of a cut lawn by providing numerous additional "clips" or cuts during operation, as contrasted with conventional mowers. My said extruded metal construction furthermore provides a very light, inexpensive, integral reel having a tubular hub throughout its length and with the blades or vanes emanating integrally from such hub to provide in conjunction with end closures, a closed construction having no apertures or air passages between the multiplicity of blades. This integral, extruded construction enables at high production, a novel and efficient multi-blade cutter reel to be formed without labor of assembly or attachment of blades to any supporting structure.

The said metal alloy extrusions, preferably utilized for my cutting reel and embodying all the phases of the present invention are preferably but not necessarily anodized, hard coated or metalized along the peripheral portions thereof and at least along the leading faces of the blades or vanes. In this connection with aluminum alloys, even a heat bath of the extruded reel arranges the aluminum molecules and produces a slightly hardened conditioning of the product.

In the construction of the reel illustrated in the drawing, the internal end closure plates 26 are provided with central, inwardly extending webbed and bossed portions 26a which are axially and cylindrically recessed to accommodate the stub shafts 9 which may be rigidly affixed thereto by suitable process by shrinking of the aluminum alloys or other metallic plug thereon. The mower embodiment illustrated includes a vertically adjustable ground-roller 27 transversely disposed of the machine behind the bed knife supporting structure and mounted on depending lugs 10d at the rear of the side frame members.

Operation

The cutter reel 4 in operation, is driven by a power source in the embodiment illustrated or by gear driving connection in manually operated mowers through driving connections with the conventional ground wheels or rear ground rollers of the mower and at a peripheral speed advantageously related with the linear travel of the device over the ground, for production of efficient shearing action.

With my improved structure, an excellent shearing fit and initial sharpening of the cutting edges 25a of the blades is obtained by initially setting the adjustment of bed knife and cutting blades rather tightly and thereafter, for a short period of time, normally operating the reel against the bed knife thereby causing the softer material of the cutter edge portions of the several blades to be abraded in an action somewhat comparable to lathe-cutting of the alloy vanes with a wide tool. Where the blades have been hard coated as by anodizing, metalizing or the like, a very thin layer of material which is harder than either the reel or the bed knife, is necessarily first removed in the process of sharpening and producing shearing fit, furnishing a "lapping" compound for quickly causing all of the cutting blades to have excellent shearing fit with the cutting edge 19a of the steel bed knife. The cutter blades 25a are simultaneously very efficiently sharpened.

Extensive tests have proven that original shearing fit and sharpening at the manufacturer's as well as subsequent resharpening by the user may be obtained by tightening of the adjustment between reel and bed knife and normal speed revolution of the cutter reel within one to two minutes.

In subsequent cutting operations, self-sharpening and maintenance of the original shearing fit ensues until at such time as the cutter blades or bed knife become knicked through striking against stones or other hard material.

Efficient shearing fit between conventional "steel-to-steel" lawn mowers (employing spider-mounted, twisted steel blades and a steel bed knife) has always been a serious problem from the manufacturer's standpoint and subsequently, after wear, on the part of the user. The average home owner has great difficulty in adjusting conventional reel mowers for efficient cutting, particularly after using his mower in areas where stones, bones and the like are prevalent.

With my improved structure, deformations in the bed knife to striking of stones and other hard objects are automatically accommodated by complementary or converse deformations of portions of the relatively soft cutting reel blades with no impairment to a highly efficient cutting of grass.

My improved mower will continually operate for long periods of time with substantially uniform shearing action between cutter reel blades and bed knife with perfect shearing fit originally obtained and very light contact or even close working clearance between bed knife and rotating blades.

In tests of my lawn mower, as described, material such as sand and even gravel has been deliberately thrown into the forward side of the cutting reel and above the bed knife during operation to substantially deform the cutter blades and in instances, producing a knicking or deformation of the bed knife. Thereafter, the adjustment between bed knife and cutter reel blades has been tightened and the cutter reel has been operated at usual speed, causing the softer cutting edges of the reel blades to be quickly sharpened and shearing fit between the blades and bed knife, to be quickly restored. With power mowers, this resharpening and replacement of substantially perfect shearing fit after such unusual tests in deforming blade edges, has usually required less than two minutes to restore very highly efficient cutting properties of the mower.

In my preferred construction of cutting reel and its cooperation with the bed knife 19 since the cutting reel presents a non-foraminous or imperforate periphery, air cannot pass outwardly and radially between the blades in blower fashion as in conventional mower reel structures of today. Furthermore, the inclination of the individual blades and their leading faces forwardly from the radial in the direction of travel, with the imperforate periphery factor, eliminates a downward blowing action upon grass in travel of the machine, ahead of the bed knife. In fact, with the cylindrical, non-foraminous hub portions between the blades, through eddy or turbulence currents generated between the blades in revolution of the reel, an overall opposite effect from that of conventional mowers is obtained producing an upward or lifting action upon the grass immediately forward of the cooperating shearing action. This is highly beneficial in the uniform cutting of a lawn.

It further should be pointed out that with my preferred extruded, integral reel construction, a reel of relatively small diameter but still having a multiplicity of quite closely spaced spiral blades, is obtained which as in machine tools, produces much smoother overall cutting and substantially increases the number of cutting "clips" upon the grass for each revolution of the reel.

The tubular type of construction of my preferred extruded reel provides an appreciably stiffer reel than one constructed in a conventional fashion, utilizing twisted blades rigidly secured to spaced spiders. The bending moment is increased appreciably. Likewise, each blade is supported integrally for its full length instead of intermittently as in a conventional reel.

The hard coating of the faces of the helical cutter blades and particularly on the leading faces thereof, provides abrasion resistance and lessens deformity of the corner edges which lead in the revolution of the reel through striking hard objects, lending durability to the machine and increasing the frequency of necessary automatic resharpening.

However, exhaustive tests recently have shown that devices of my invention where the reel R is made from aluminum alloy without hard coating (anodizing, metalizing or other coating of any kind) gave very satisfactory results for all purposes intended.

The forward inclination of the individual blades from the radial in the direction of travel (preferably at an angulation range between 15 and 20 degrees) provides important new and improved results whether applied in the preferred form of my extruded integral reel or in reels made up of a number of parts even including the application and mounting of blades on spiders. With such angulation of the several blades from the radial, the striking of obstructions during mowing with sufficient force to deflect a blade or blades backwardly even to a maximum of twice the pre-formed angulation, would not reduce the overall or orbital cylinder diameter. This is modified by the fact that the blade in such deflection would not deflect by rotating about its point of joining the cylinder, but rather in a gradual curve. Under any conditions of being bent aft (in the opposite direction from its rotation) its diameter increases to a certain point (the radial) and within this range, is automatically ground to a new face which still conforms to this orbital cylinder.

It will of course be understood that various changes may be made in the form, details and arrangements of parts and in the use of equivalency, all within the scope of my invention.

What is claimed is:

1. In reel-type mowers, a wheeled frame, a rotary cutter reel mounted for driving on said frame and having a multiplicity of circumferentially spaced, helically and longitudinally extending cutting blades, each of said blades having a longitudinally extending cutting edge and an adjacent forward face which faces in the direction of rotation, a stationary, substantially straight bed knife below said reel having a narrow forward cutting edge disposed transversely of the mower and being constructed of thin, relatively hard material such as steel, mechanism for adjusting the relative vertical relation between said cutting reel and said bed knife and permissive of "tightening" adjustment to cause said reel-cutting blades to successively scrape against the cutting edge of said bed knife and said reel-cutting blades having at least their outermost, longitudinally extending portions constructed of relatively soft material contrasted with said bed knife whereby upon tightening the relationship between said bed knife and successive reel-cutting blades, abrasive wear of said softer blades against said bed knife will automatically provide in operation, an excellent shearing fit between said parts with self-sharpening of said reel-blades.

2. The structure set forth in claim 1 wherein at least the forward faces of said reel blades relative to direction of revolution are hard coated but wherein the blades throughout the main portion of their thickness are constructed of substantially rigid material having much softer abrasive qualities than that of said bed knife.

3. The structure set forth in claim 1 wherein said reel throughout substantially its length, has substantially imperforate portions interconnecting the reel blades and disposed in segments of a common cylinder therebetween.

4. In reel-type mower construction, a frame, ground-engaging wheels supporting said frame, a rotary cutter reel mounted for driving in said frame and having a substantially closed hub of general cylindrical formation and a multiplicity of helically extending cutting blades disposed longitudinally of said hub and emanating integrally therefrom, a stationary, straight bed knife supported from said frame below said reel and having a narrow forward cutting edge disposed close to vertical alignment with the axis of said reel and being constructed of relatively hard material such as steel, mechanism for adjusting the relative vertical relationship of said cutter reel with said bed knife to produce shearing and contacting relation therebetween and the cutting blades of said reel all being constructed from a material substantially softer in characteristics than the material of said bed knife whereby through said adjustment mechanism and operation of said reel an excellent shearing fit is obtainable as well as self-sharpening of the reel-cutting blades in operation.

5. The structure set forth in claim 4 further characterized by said helically extending cutting blades in cross sectional shape having leading faces in relation to directional revolution, angled acutely forwardly in the direction of rotation from radial.

6. Apparatus as defined in claim 1 wherein the forward faces of blades are inclined within a range of from 15 to 20 degrees from the radial and forwardly in the direction of revolution from radial whereby striking of objects and attendant backward bending of said blades from the forwardly inclined relation will move the radially outward portion of the blades radially outward of the reel.

References Cited in the file of this patent

UNITED STATES PATENTS

| | | |
|---|---|---|
| 1,945,582 | White | Feb. 6, 1934 |
| 2,496,022 | Remonte | Jan. 31, 1950 |
| 2,521,262 | Smith | Sept. 5, 1950 |
| 2,630,668 | McDermott | Mar. 10, 1953 |